United States Patent [19]
Ibaraki et al.

[11] Patent Number: 6,003,626
[45] Date of Patent: *Dec. 21, 1999

[54] HYBRID DRIVE SYSTEM FOR MOTOR VEHICLE, HAVING MEANS FOR INHIBITING ELECTRICITY GENERATING DRIVE MODE

[75] Inventors: Ryuji Ibaraki, Toyota; Yutaka Taga, Aichi-ken; Atsushi Tabata, Okazaki, all of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,710

[22] Filed: Oct. 4, 1996

[30] Foreign Application Priority Data

Oct. 5, 1995 [JP] Japan ................... 7-258400

[51] Int. Cl.$^6$ ................................... B60K 6/04
[52] U.S. Cl. .......................... 180/65.2; 180/65.4
[58] Field of Search ................ 180/65.2, 65.3, 180/65.4, 65.6; 701/101

[56] References Cited

U.S. PATENT DOCUMENTS

| | | | |
|---|---|---|---|
| 4,305,254 | 12/1981 | Kawakatsu et al. | 180/65.2 |
| 4,335,429 | 6/1982 | Kawakatsu | 180/65.2 |
| 4,588,040 | 5/1986 | Albright, Jr. et al. | 180/65.4 |
| 5,343,970 | 9/1994 | Severinsky | 180/65.2 |
| 5,495,906 | 3/1996 | Furutani | 180/65.4 |
| 5,670,830 | 9/1997 | Koga et al. | 180/65.2 |
| 5,697,466 | 12/1997 | Moroto et al. | 180/65.2 |
| 5,927,415 | 7/1999 | Ibaraki et al. | 180/65.3 |

FOREIGN PATENT DOCUMENTS

| | | |
|---|---|---|
| 5-50865 | 3/1993 | Japan . |
| 5-199605 | 8/1993 | Japan . |
| 6-38304 | 2/1994 | Japan . |

OTHER PUBLICATIONS

Patent Abstracts of Japan, vol. 18, No. 335, (M–1627) Jun. 24, 1994, JP–6080048, Mar. 22, 1994.
Patent Abstracts of Japan, vol. 95, No. 3, JP7–067208, Mar. 10, 1995.
IEE Proceedings–D/Control Theory and Applications, vol. 134, No. 6, pp. 373–387, Nov. 1987, J.R. Bumby, et al., "Optimisation and Control of a Hybrid Electric Car".

*Primary Examiner*—J. J. Swann
*Assistant Examiner*—Frank Vanaman
*Attorney, Agent, or Firm*—Oblon, Spivak, McClelland, Maier & Neustadt, P.C.

[57] ABSTRACT

Hybrid motor vehicle drive system including an electric motor operated by an electric energy generated by an electric generator and stored in a storage device, an engine, and a controller for controlling the engine and electric generator to operate in an electricity generating drive mode when a predetermined condition is satisfied, such that the engine is operated so as to provide an output greater than a required power to drive the motor vehicle, so that the vehicle is driven by the engine with the required power while the electric generator is operated by the engine with a surplus power to charge the storage, and wherein the controller includes a special control device operated in the event of a failure of the electric generator, for inhibiting the selection of the electricity generating drive mode and selecting an engine drive mode to operate the engine for driving the motor vehicle with the required power, even when the predetermined condition is satisfied.

15 Claims, 4 Drawing Sheets

HYBRID DRIVE SYSTEM FOR MOTOR VEHICLE, HAVING MEANS FOR INHIBITING ELECTRICITY GENERATING DRIVE MODE

BACKGROUND OF THE INVENTION

1. Field of the Invention

The present invention relates in general to a so-called hybrid drive system for driving a motor vehicle, which drive system includes an engine and an electric motor as two drive power sources. More particularly, the invention is concerned with an improvement of such a hybrid drive system which is operable in an electricity generating drive mode wherein an electric generator or dynamo is driven by a surplus power of the engine during running of the vehicle with the engine selected as the effective drive power source, so that an electric energy produced by the electric generator is stored in an electric energy storage device.

2. Discussion of the Related Art

JP-A-5-50865 discloses an example of such hybrid drive system including two drive power sources consisting of (a) an electric motor operated by an electric energy stored in an electric energy storage device, and (b) an engine operated by combustion of a fuel. The hybrid drive system is generally adapted such that the vehicle is run with the electric motor under a relatively small load, and is run with the engine under a relatively large load. The vehicle is run in an electricity generating drive mode when a predetermined running condition is satisfied, for example, when the amount of the electric energy stored in the electric energy storage device has been reduced below a predetermined threshold. In the electricity generating drive motor, the engine is operated by combustion of a fuel so as to provide an output which is larger than a required power necessary for running the vehicle, so that a suitable electric generator is driven by surplus power of the engine. The surplus power is equal to the overall engine output minus the required power just enough to run the vehicle. In this electricity generating drive motor, the vehicle is run by operation of the engine while the electric generator is driven by the surplus power of the engine to store electric energy in the electric energy storage device. Commonly, the electric motor provided as one of the two drive power sources is adapted to also function as the electric generator. In this case, the hybrid drive system does not require an exclusive electric generator or dynamo.

In the event of some failure of the electric generator in the conventional hybrid drive system, the overall output of the engine produced in the electricity generating drive mode is used as the power to drive the motor vehicle. Since the overall output is greater than the power required to run the vehicle, the vehicle tends to be accelerated to an excessively larger extent than in the normal condition of the hybrid drive system. This excessive acceleration of the vehicle is not expected by the vehicle operator and is not desirable.

SUMMARY OF THE INVENTION

It is therefore an object of the present invention to provide a hybrid drive system for a motor vehicle, which does not suffer from an undesirable change in the running performance of the vehicle even in the event of a failure of the electric motor.

The above object may be achieved according to the principle of the present invention, which provides a hybrid drive system for a motor vehicle, comprising: (a) an electric generator for generating an energy; (b) an electric energy storage device for storing the electric energy generated by the electric generator; (c) an electric motor operated as a first drive power source by the electric energy stored in the electric energy storage device; (d) an engine operated as a second drive power source by combustion of a fuel; and (e) a controller for controlling the engine and the electric generator to operate in an electricity generating drive mode when a predetermined condition is satisfied, such that the engine is operated so as to provide an output greater than a required power necessary for driving the motor vehicle, so that the motor vehicle is driven by the engine with the required power while the electric generator is operated by the engine with a surplus power to charge the electric energy storage device, the surplus power being equal to the output minus the required power, wherein the controller includes special control means operated in the event of a failure of the electric generator, for inhibiting the selection of the electricity generating drive mode and selecting an engine drive mode to operate the engine for driving the motor vehicle with the required power, even when the predetermined condition for selecting the electricity generating drive mode is satisfied.

In the hybrid drive system of the present invention constructed as described above, the electricity generating drive mode is not selected in the event of a failure of the electric generator, even when the predetermined condition for selecting the electricity generating drive mode is satisfied. In this event, the controller selects the engine drive mode in which the vehicle is driven by the engine with the required power just enough to run the vehicle. Thus, the acceleration value of the vehicle in the above event remains the same as in the normal state of the electric generator. That is, the present hybrid drive system does not suffer from excessive acceleration of the vehicle unexpected by the vehicle operator, even when the electric generator is defective.

In the electricity generating drive mode which is normally established when the predetermined condition is satisfied, the electric generator is operated by the surplus power of the engine, which is the overall output of the engine minus the required power used to drive the vehicle. The electric generator may be provided for the sole purpose of generating the electric energy to be consumed by the electric motor. However, the electric motor may be adapted to also function as the electric generator. In this case, the special control means of the controller is activated at least when the electric motor fails to normally function as the electric generator (but is normally operated by the electric energy stored in the electric energy storage device).

The special control means of the controller may be adapted to be activated to select the engine drive mode for driving the vehicle with the required power, at least when the electricity generating drive mode would be selected with the predetermined condition being satisfied if the electric generator was normal. Described in detail, the hybrid drive system having the engine drive mode and the electricity generating drive mode may have other drive modes such as a motor drive mode in which only the electric motor is operated to drive the vehicle, and an engine-motor drive mode in which the engine and the electric motor are both operated to drive the vehicle. The engine drive mode is selected when the vehicle running load is relatively high, and the motor drive mode is selected when the vehicle running load is relatively high. The engine-motor drive mode is selected when the vehicle running load is considerably high. In this case, the special control means may be activated in the event of a failure of the electric generator, so as to replace at least the electricity generating drive mode with the engine drive mode. In other words, the special control means need not be activated when the engine drive mode, motor drive mode or engine-motor drive mode is selected by the controller. However, the special control means is desirably adapted to be activated when the motor drive mode or engine-motor drive mode is selected, as well as when the electricity generating drive mode is selected, in the case where the electric motor also functions as the electric generator. In this case, the failure of the electric generator may influence the operations of the hybrid drive system in the motor drive mode and the engine-motor drive mode as well as the operation in the electricity generating drive mode.

The controller may further include means for determining whether the predetermined condition for selecting the electricity generating drive mode is satisfied or not. This means may be adapted to determine whether the predetermined condition is satisfied or not whether an amount of the electric energy stored in the electric energy storage device is smaller than a predetermined lower limit.

The controller may further include means for determining whether the electric generator fails to normally function due to a failure of the electric generator per se, and may further include means for determining whether the electric generator fails to normally function due to a failure of a motor/generator control device which controls the electric motor and the electric generator.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
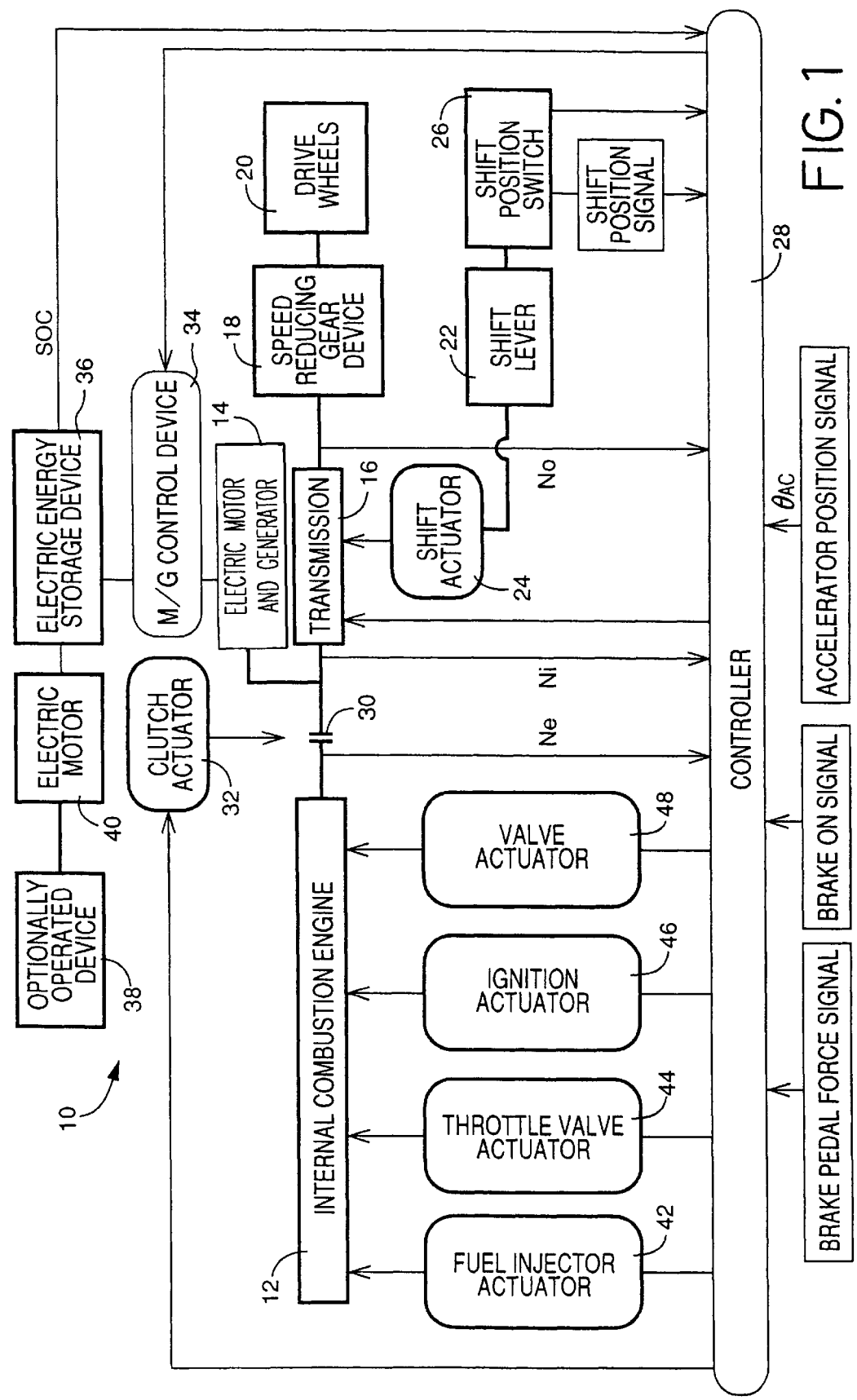
FIG. 1 is a block diagram illustrating a hybrid drive system for a motor vehicle, which is constructed according to one embodiment of this invention.

Referring first to the block diagram of FIG. 1, there is diagrammatically illustrated a hybrid drive system 10 for driving a motor vehicle. In FIG. 1, thick solid lines indicate mechanical connection of components, while thin solid lines indicate electrical connection of components. The hybrid drive system 10 includes two drive power sources, namely, an internal combustion engine 12 such as a gasoline engine operated by combustion of a fuel, and an electric motor 14 operated by an electric energy. Power of the engine 12 and the power of the electric motor 14 are simultaneously or selectively transmitted to a transmission 16, and transferred to drive wheels 20 of the vehicle through a speed reducing gear device and a differential gear device. The transmission 16 includes a forward-reverse switching mechanism and a shift mechanism. The switching mechanism has three positions: forward position (FWD) for running the vehicle in the forward direction; reverse position (REV) for running the vehicle in the rearward direction; and neutral position (N). The shift mechanism has a plurality of forward-driving positions having respective different speed ratios, which are selectively established when the forward-reverse switching mechanism is placed in the forward position (FWD). The transmission 16 is shifted by a shift actuator 24 so that the transmission 16 is placed in one of the neutral and reverse positions and the forward-driving positions, depending upon the currently selected position of a shift lever 22. Described in detail, the currently selected position of the shift lever 22 is detected by a shift position switch 26. The shift actuator 24 is controlled by a controller 28, according to a SHIFT POSITION signal received from the shift position switch 26 indicative of the currently selected position of the shift lever 22. The engine 12 and the transmission 16 are connected to each other through a clutch 30, which is engaged and released by a clutch actuator 32 under the control of the controller 28. Normally, the clutch 30 is placed in its engaged position.

The electric motor 14 is connected to an electric energy storage device 36 such as a battery or condenser, through a motor/generator control device 34 (hereinafter referred to as "M/G control device 34"). The electric motor 14 is selectively placed in a DRIVE state, a CHARGING state, and a NON-LOAD state by the M/G control device 34 under the control of the controller 28. In the DRIVE state, the motor 14 is driven by an electric energy supplied from the electric energy storage device 36. In the CHARGING state, the motor 14 functions as an electric generator or dynamo, with regenerative braking (braking torque electrically generated by the motor 14 itself), for storing an electric energy in the electric energy storage device 36. In the NON-LOAD state, the output shaft of the motor 14 is permitted to rotate freely. The engine 12 is controlled by various actuators including an actuator 42 for controlling a fuel injector valve, an actuator 44 for controlling a throttle valve, an actuator 46 for controlling an ignitor, and an actuator 48 for controlling intake and discharge valves. Like the M/G control device 34, these actuators 42, 44, 46, 48, are controlled by the controller 28. The electric energy storage device 36 is electrically connected to an electric motor 40 used for driving an optionally operated device 38 such as a compressor for an air conditioner.

The controller 28 is principally constituted by a microcomputer incorporating a central processing unit (CPU), a random-access memory (RAM) and a read-only memory (ROM). The controller 28 performs data processing operations to execute various control routines such as those illustrated in the flow charts of FIGS. 2–4, according to control programs stored in the ROM. The controller 28 receives output signals of various detectors, which includes the SHIFT POSITION signal received from the shift position switch 26. Since an operation of the shift lever 22 can be detected on the basis of the SHIFT POSITION signal of the shift position switch 26, this signal permits determination as to whether the transmission 16 is placed in a position in which engine brake is applied to the vehicle. The output signals of the detectors received by the controller 28 further include: a signal indicative of a rotating speed Ne of the engine 12; a signal indicative of a rotating speed Ni of the input shaft of the transmission 16 (i.e., rotating speed of the drive shaft of the electric motor 14); a signal indicative of a rotating speed No of the output shaft of the transmission 16

(which can be used to determine a running speed V of the vehicle); a signal indicative of an amount of electric energy SOC stored in the electric energy storage device 22; an ACCELERATOR POSITION signal indicative of an amount of operation $\theta_{AC}$ of an accelerator pedal; a BRAKE ON signal indicative of an operation of a brake pedal by the vehicle operator; and a BRAKE PEDAL FORCE signal indicative of a depression force acting on the brake pedal. The electric energy amount SOC can be obtained from an electric current or charging efficiency of the electric motor 14 when the motor 14 is operated as the electric generator in the CHARGING state.

Referring next to the flow chart of FIG. 2, a basic control routine executed by the present hybrid drive system 10 will be described. The routine is initiated with step S1 to read the amount of operation $\theta_{AC}$ of the accelerator pedal, the engine speed Ne, the input shaft speed Ni and output shaft No of the transmission 16, the amount of electric energy SOC stored in the electric energy storage device 36, a torque $T_E$ of the engine 12 and a torque $T_M$ of the electric motor 14. The engine torque $T_E$ may be calculated on the basis of the opening angle of the throttle valve, or the amount of fuel injection into the engine 12, for example. The motor torque $T_M$ may be calculated on the basis of an electric current of the electric motor 14, for example. Then, the control flow goes to step S2 to determine whether the electric motor 14 fails to normally function as the drive power source (for driving the motor vehicle) and/or the electric generator 14 (for generating an electric energy to be stored in the electric energy storage device 36). The failure of the electric motor or generator 14 includes a failure of the MG control device 34, and other defects that prevent normal functioning of the electric motor or generator 14. The determination in step S2 may be effected, for example, on the basis of a relationship between the motor torque $T_M$ (which is calculated from the electric current of the motor 14) and the actual rotating speed of the electric motor 14 (i.e., input shaft speed Ni of the transmission 16), or on the basis of a relationship between the engine speed Ne during operation of the electric motor 14 as the electric generator and a selected one of the electric current of the motor 14, input shaft speed Ni and output shaft speed No. If a negative decision (NO) is obtained in step S3, the control flow goes to step S3 for executing a normal control routine illustrated in detail in the flow chart of FIG. 3. If an affirmative decision (YES) is obtained in step S2, that is, if the electric motor 14 fails to normally function, the control flow goes to step S4 for executing a special control routine illustrated in the flow chart of FIG. 4.

Figure 3:
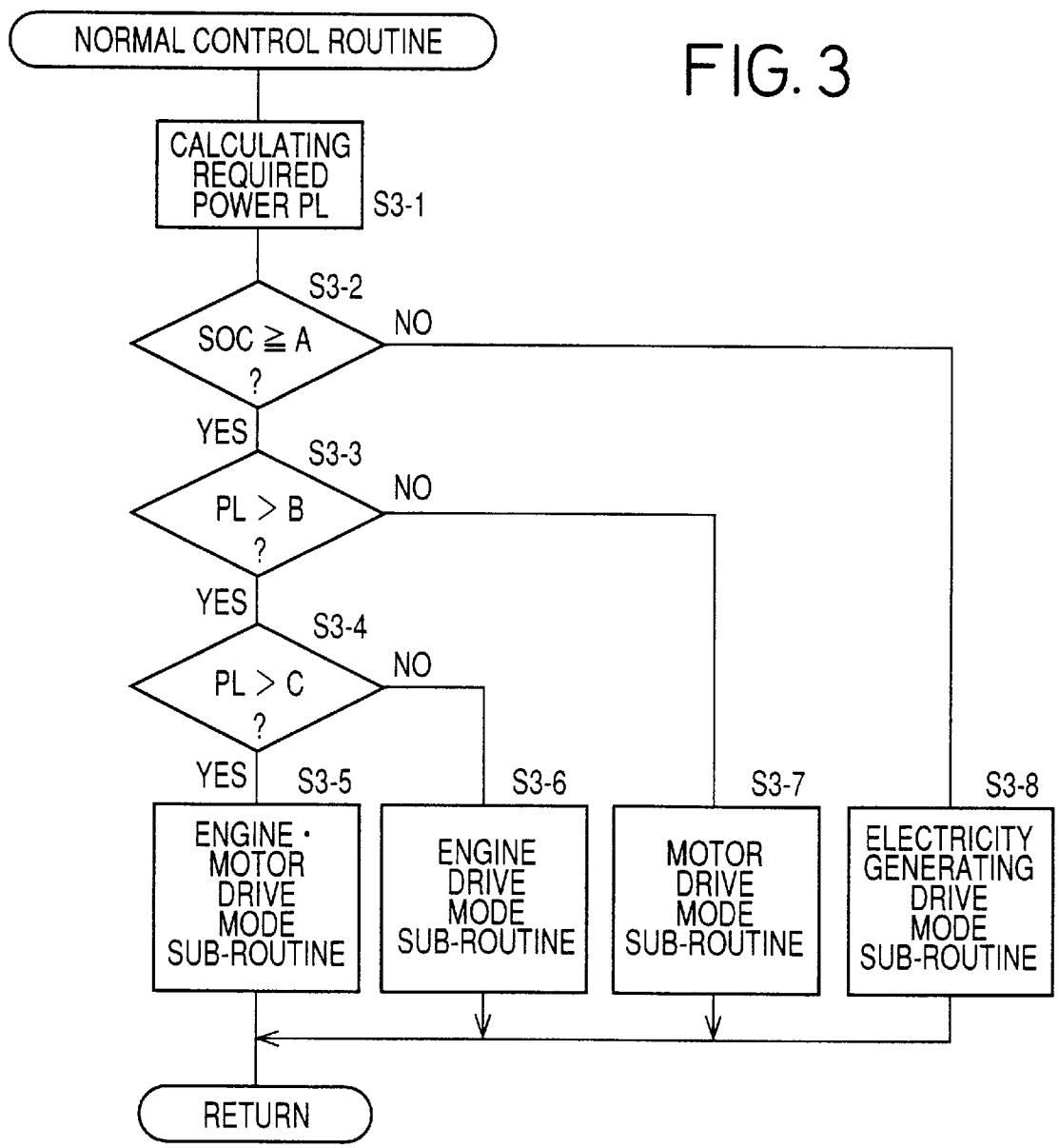
FIG. 3 is a flow chart showing in detail a normal control routine in step S3 of the basic routine of FIG. 2, which is executed when the electric motor of the system is normal.

The normal control routine will be described by reference to the flow chart of FIG. 3. This routine is initiated with step S3-1 to calculate a required power PL necessary to drive the motor vehicle in the present running condition of the vehicle. This required power PL may be calculated based on the detected amount of operation $\theta_{AC}$ of the accelerator pedal or a rate of change of this amount $\theta_{AC}$ and the vehicle running speed V, for example, and according to a predetermined relationship between the required power PL and the amount $\theta_{AC}$ (or rate of change thereof) and vehicle running speed V). This relationship may be represented by an equation or data map stored in the ROM of the controller 28. Step S3-1 is followed by step S3-2 to determine whether the amount of electric energy SOC stored in the electric energy storage device 36 is equal to or larger than a predetermined lower limit A. If an affirmative decision (YES) is obtained in step S3-2, the control flow goes to step S3-3 and the following steps. If a negative decision (NO) is obtained in step S3-2, the control flow goes to step S3-8 to implement an electricity generating drive mode sub-routine. The lower limit A is the minimum amount of the electric energy required to operate the electric motor 14 for driving the motor vehicle in an engine-motor drive mode or a motor drive mode in which the electric motor 14 is operated as the drive power source, as described below with respect to steps S3-5 and S3-7. The lower limit A is determined depending upon the charging and discharging efficiencies of the electric energy storage device 35. For example, the lower limit A is in the neighborhood of 70% of the full capacity of the device 36. In the electricity generating drive mode sub-routine in step S3-8, the hybrid drive system 10 is operated in an electricity generating drive mode in which the engine 12 is operated so as to provide an output which is larger than the calculated required power PL, and the electric motor 14 is operated as the electric generator with the surplus power which is a difference between the engine output and the required power PL, so that the electric energy generated by the electric generator 14 is stored in the electric energy storage device 36. Described more specifically, the controller 28 controls the M/G control device 34 such that the surplus power of the engine is consumed by the electric generator 14 so that the calculated required power PL is transmitted from the engine 12 to the transmission 16 for driving the vehicle. The torque $T_E$ and speed Ne of the engine 12 and the electric generator 14 are controlled depending upon the currently selected position of the transmission 16 and the expected power loss of the system. It will be understood that a portion of the controller assigned to implement step S3-8 constitutes means for controlling the hybrid drive system 10 in the electricity generating drive mode. This mode is selected when the negative decision (NO) is obtained in step S3-2, namely, when the amount of electric energy SOC currently stored in the electric energy storage device 36 is smaller than the predetermined lower limit A.

Step S3-3 implemented when the affirmative decision (YES) is obtained in step S3-2 is provided to determine whether the required power PL is larger than a predetermined first threshold value B. If an affirmative decision (YES) is obtained in step S3-3, the control flow goes to step S3-4 to determine whether the required power PL is larger than a predetermined second threshold value C which is larger than the first threshold value B. If the negative decision (NO) is obtained in step S3-3, that is, if the required power PL is equal to or smaller than the first threshold value B, it means that the motor vehicle is currently running under a relatively low load. In this case, the control flow goes to step S3-7 to implement a motor drive mode sub-routine. If an affirmative decision (YES) is obtained in step S3-3 while a negative decision (NO) is obtained in step S3-4, that is, if the required power PL is larger than the first threshold value B and is equal to or smaller than the second threshold value C, it means that the vehicle is currently running under a medium load. In this case, the control flow goes to step S3-6 to implement an engine drive mode sub-routine. If an affirmative decision (YES) is obtained in step S3-4, that is, the required power PL is larger than the second threshold value C, it means that the vehicle is running under a relatively high load. In this case, the control flow goes to step S3-5 to implement an engine-motor drive mode sub-routine.

In the motor drive mode sub-routine in step S3-7, the hybrid drive system 10 is operated in the motor drive mode indicated above with respect to the lower limit A. In the motor drive mode, only the electric motor 14 is operated as the drive power source for running the vehicle. In the engine drive mode sub-routine in step S3-6, the hybrid drive system 10 is operated in an engine drive mode in which only the engine 12 is operated as the drive power source for running the vehicle. In the engine-motor drive sub-routine in step S3-5, the hybrid drive system 10 is operated in the engine-motor drive mode indicated above with respect to the lower limit A. In the engine-motor drive mode, the engine 12 and the electric motor 14 are both operated as the drive power sources for running the vehicle. In these drive modes in steps S3-5, S3-6 and S3-7, the outputs of the engine 12 and electric motor 14 are controlled depending upon the currently selected position of the transmission 16 and the expected power loss. In the engine drive mode in step S3-6, the electric motor 14 is held in a non-load condition. In the motor drive mode in step S3-7, the clutch 30 is placed in the released state so that the output of the electric motor 14 is transmitted to only the transmission 16.

Figure 5:
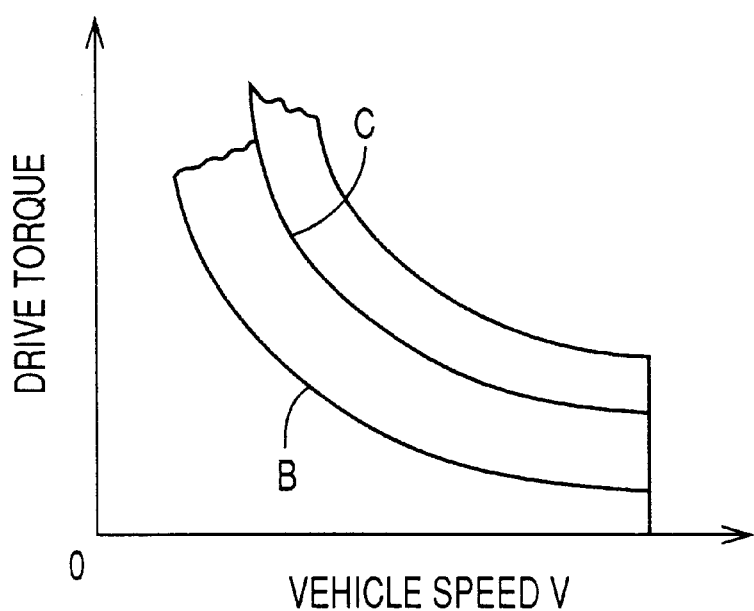
FIG. 5 is a graph for explaining threshold values B and C used in the normal control routine of FIG. 3.

Each of the first and second threshold values B and C may be determined depending upon the current running condition of the vehicle, for instance, on the basis of the vehicle drive torque and the vehicle speed V and according to a predetermined relationship as shown in FIG. 5 by way of example. This relationship is provided for each of the forward-drive positions of the transmission 16. When the running condition of the vehicle as represented by the drive torque and speed V is in an area on a lower load side of a curve representative of the first threshold B, namely, on the side nearer to the origin "0", it means that the required power PL is equal to or smaller than the first threshold B. In this case, step S3-7 is implemented to execute the motor drive mode sub-routine. When the running condition is in an area between the curve representative of the first threshold B and a curve representative of the second threshold C, it means that the required power PL is larger than the first threshold B and is equal to or smaller than the second threshold C. In this case, step S3-6 is implemented to execute the engine drive mode sub-routine. When the running condition is in an area on a higher load side of the curve representative of the second threshold C, it means that the required power PL is larger than the second threshold C. In this case, step S3-5 is implemented to execute the engine-motor drive mode sub-routine. The above relationship may be determined to determine the first threshold value B on the basis of the fuel consumption efficiency (amount of consumption of fuel per unit power) and emission gas ratio (amount of the emission gas per unit power) of the engine 12 and the energy conversion efficiency of the electric motor 14, for minimizing the amount of fuel consumption and the amount of emission gas of the engine 12.

Figure 4:
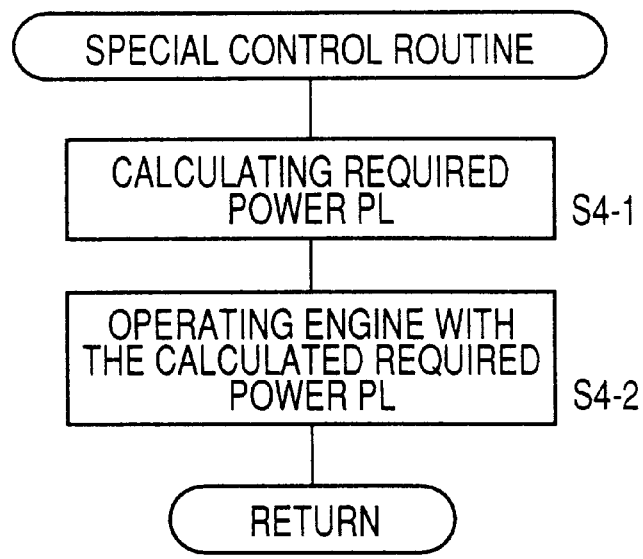
FIG. 4 is a flow chart showing in detail a special control routine in step S4 of the basic routine of FIG. 2, which is executed in the event of a failure of the electric motor.

The special control routine in step S4 of FIG. 2 which is executed in the event of a failure of the electric motor 14 will be described by reference to the flow chart of FIG. 4. This special control routine is initiated with step S4-1 to calculate a required power PL necessary to drive the motor vehicle in the present running condition of the vehicle, as in step S3-1 of FIG. 3. Then, the control flow goes to step S4-2 to operate the engine 12 with the calculated required power PL for driving the vehicle, irrespective of the magnitude of the required power PL. In this case, too, the output of the engine 12 is controlled depending upon the currently selected position of the transmission 16 and the expected power loss.

It will be understood that when the electric motor 14 is not normally functioning, the hybrid drive system 10 is placed in the engine drive mode and the engine 12 is operated so as to provide the required power PL for driving the motor vehicle, regardless of the current running condition of the vehicle as represented by the drive torque and speed V, that is, regardless of the current running load of the vehicle. Thus, the vehicle can be driven by the engine 12 with the required power PL, in a suitable fashion without excessive acceleration, even in the event of a failure of the electric motor 14.

In other words, the hybrid drive system 10 would not be placed in the electricity generating drive mode even when the stored electric energy amount SOC has been reduced to the lower limit A, if some failure of the electric motor 14 is detected in step S2. In this case, the hybrid drive system 10 is placed in the engine drive mode in the special control routine of FIG. 4 in which the vehicle is run with the engine 12 being controlled so as to provide the required power PL, so that the acceleration value of the vehicle is substantially the same as in the normal state of the electric motor 14. Thus, the present hybrid drive system 10 adapted to execute the special control routine of FIG. 4 in the event of a failure of the electric motor 24 does not suffer from excessive acceleration of the vehicle as experienced in the conventional hybrid drive system, which excessive acceleration is not expected by the vehicle operator and is not desirable. If the electricity generating drive mode sub-routine in step S3-8 was implemented in the event of some failure of the electric motor 14, the overall output of the engine 12 produced in the electricity generating drive mode would be used as the power to drive the motor vehicle. Since the overall output is greater than the calculated required power PL just enough to run the vehicle, the vehicle tends to be accelerated to an excessively larger extent than in the normal state of the electric motor 14, contrary to the vehicle operator's will.

Figure 2:
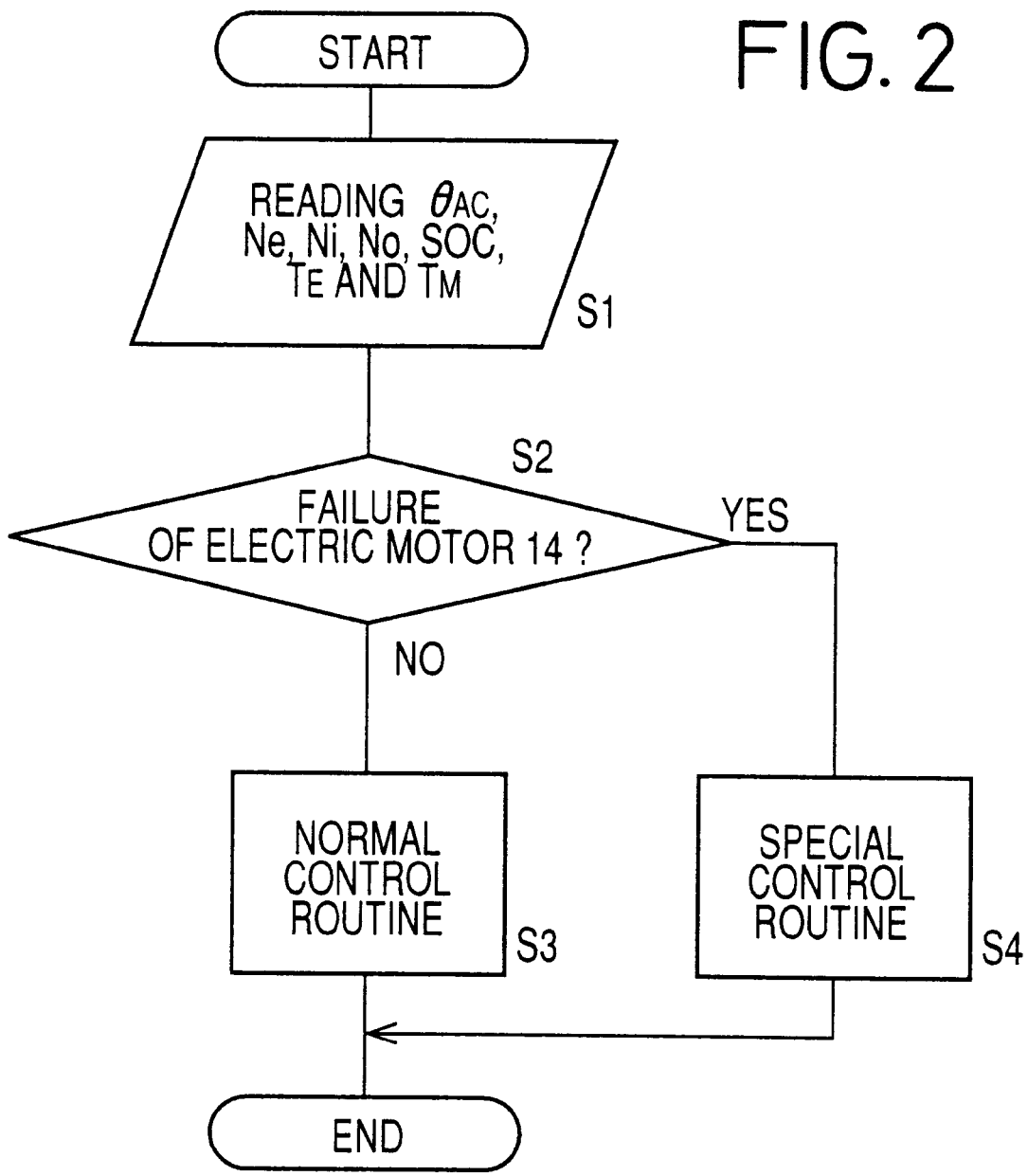
FIG. 2 is a flow chart for explaining a basic routine executed by the hybrid drive system of FIG. 1.

It will be understood that a portion of the controller 28 assigned to implement step S4 of FIG. 2 (i.e., special control routine of FIG. 4) constitutes special control means operated in the event of a failure of the electric motor 14 (electric generator), for inhibiting the selection of the electricity generating drive mode and selecting the engine drive mode to operate the engine 13 for driving the vehicle with the required power PL, even when a predetermined condition for selecting the electricity generating drive mode is satisfied, that is, even if the negative decision (NO) is obtained in step S3-2. It will also be understood that a portion of the controller 28 assigned to implement step S3-2 constitutes means for determining whether the predetermined condition for selecting the electricity generating drive mode is satisfied or not, and that a portion of the controller 28 assigned to implement step S2 constitutes means for determining whether the electric generator 14 fails to normally function, namely, is not operable to normally function for some reason or other such as a failure of the electric generator 14 per se or a failure of the M/G control device 34.

While the presently preferred embodiment of this invention has been described above in detail by reference to the accompanying drawings, it is to be understood that the present invention is not limited to the details of the illustrated embodiment but may be otherwise embodied.

The hybrid drive system 10 in the illustrated embodiment uses the transmission 16 having two or more forward-drive positions having respective different speed ratios. However, the principle of the present invention is equally applicable to a hybrid drive system using a continuously variable transmission whose speed ratio is continuously variable, or a hybrid drive system which does not use a transmission for changing the speed ratio of the power transmitting system.

While the transmission 16 used in the illustrated embodiment includes a switching mechanism having the forward and reverse positions, this mechanism is not essential and may be eliminated. Where the switching mechanism is eliminated, the vehicle can be run backward by operating the bidirectionally operable electric motor 14 in the reverse direction.

Although the clutch 30 is provided between the engine 12 and the transmission 16 in the illustrated embodiment, another clutch may be provided between the transmission 16 and the electric motor 14, or any other position as needed.

The present invention is equally applicable to a hybrid drive system of the type in which the outputs of the engine 12 and electric motor 14 are transmitted to the transmission 16 through a planetary gear device.

In the illustrated embodiment, the single electric motor 14 is used for driving the two drive wheels 20, an electric motor may be provided for each of the drive wheels 20.

It is to be understood that the present invention may be embodied with various other changes, modifications and improvements, which may occur to those skilled in the art.

What is claimed is:

1. A hybrid drive system for a motor vehicle, comprising:
   an electric generator for generating electric energy;
   an electric energy storage device for storing the electric energy generated by said electric generator;
   an electric motor operated as a first drive power source by the electric energy stored in said electric energy storage device;
   an engine operated as a second drive power source by combustion of a fuel; and
   a controller for controlling said engine and said electric generator to operate in an electricity generating drive mode when a predetermined condition is satisfied, such that said engine is operated so as to provide an output greater than a required power necessary for driving the motor vehicle, so that the motor vehicle is driven by said engine with said required power while said electric generator is operated by said engine with a surplus power to charge said electric energy storage device, said surplus power being said output minus said required power,
   said controller including drive power control means operated in response to a failure of said electric generator, for calculating said required power necessary for driving the motor vehicle in a present running condition of the motor vehicle, for inhibiting a selection of said electricity generating drive mode, and for selecting an engine drive mode that drives the motor vehicle with said required power but not said surplus power, even when said predetermined condition for selecting said electricity generating drive mode is satisfied.

2. A hybrid drive system according to claim 1, wherein said electric motor and said electric generator are a single unit configured to selectably operate in one of an electric motor operational mode and an electric generator operational mode.

3. A hybrid drive system according to claim 1, wherein said controller further includes means for determining whether said predetermined condition for selecting said electricity generating drive mode is satisfied or not, by determining whether an amount of the electric energy stored in said electric energy storage device is smaller than a predetermined lower limit.

4. A hybrid drive system according to claim 1, wherein said controller further includes means for determining whether said electric generator fails to normally function due to a failure of said electric generator per se.

5. A hybrid drive system according to claim 1, further comprising a motor/generator control device for controlling said electric generator and said electric motor, and wherein said controller further includes means for determining whether said electric generator fails to normally function due to a failure of said motor/generator control device.

6. A hybrid drive system according to claim 1, wherein said controller selects one of said engine drive mode, a motor drive mode in which only said electric motor is operated to drive the motor vehicle, and an engine-motor drive mode in which said engine and said electric motor are both operated to drive the motor vehicle, depending upon a current running condition of the motor vehicle, if said predetermined condition for selecting said electricity generating drive mode is not satisfied.

7. A hybrid drive system according to claim 6, wherein said controller selects one of said engine drive mode, said motor drive mode and said engine-motor drive mode, depending upon a current running load of the motor vehicle.

8. A hybrid drive system according to claim 7, wherein said controller includes means for determining said current running load of the motor vehicle, depending upon a drive torque and a running speed of the motor vehicle.

9. A hybrid drive system for a motor vehicle, comprising:
   an electric generator configured to generate electric energy;
   an electric energy storage device configured to store the electric energy generated by said electric generator;
   an electric motor operated as a first drive power source by the electric energy stored in said electric energy storage device;
   an engine operated as a second drive power source by combustion of a fuel; and
   a controller configured to control said engine and said electric generator to operate in an electricity generating drive mode when a predetermined condition is satisfied, such that said engine is operated so as to provide an output greater than a required power necessary for driving the motor vehicle, so that the motor vehicle is driven by said engine with said required power while said electric generator is operated by said engine with a surplus power to charge said electric energy storage device, said surplus power being said output minus said required power,
   said controller including a drive power control mechanism connected to said electric generator and configured to calculate said required power necessary for driving the motor vehicle in a present running condition of the motor vehicle, and to inhibit a selection of said electricity generating drive mode when a failure signal is sent thereto, said failure signal being indicative of a failure of said electric generator, said drive power control mechanism being configured to select an engine drive mode in response to receiving said failure signal such that said output of said engine is adjusted to power the motor vehicle with said required power, but not said surplus power, when said predetermined condition is satisfied.

10. The hybrid drive system according to claim 9, wherein:
    said electric motor and said electric generator are a single unit configured to selectably operate in one of an electric motor operational mode and an electric generator operational mode.

11. The hybrid drive system according to claim 9, wherein:

said controller further includes a determination mechanism configured to determine when said predetermined condition is satisfied, by determining whether an amount of the electric energy stored in said electric energy storage device is smaller than a predetermined amount.

12. The hybrid drive system according to claim 9, further comprising:

a motor/generator control device configured to control a selection of said electric generator and said electric motor, said electric generator generating the electric energy when selected and said electric motor operating as the first power drive source when selected; and said controller further including a determination mechanism configured to determine whether said electric generator experiences a fault condition.

13. The hybrid drive system according to claim 9, wherein:

said controller is configured to select one of said engine drive mode, a motor drive mode in which only said electric motor is operated to drive the motor vehicle, and an engine·motor drive mode in which said engine and said electric motor are both operated to drive the motor vehicle, depending on a current running condition of the motor vehicle, if said predetermined condition for selecting said electricity generating drive mode is not satisfied.

14. The hybrid drive system according to claim 13, wherein:

said controller is configured to select one of said engine drive mode, said motor drive mode, and said engine·motor drive mode, depending on a current running load of the motor vehicle.

15. The hybrid drive system according to claim 14, wherein:

said controller includes a determination mechanism configured to determine said current running load of said motor vehicle, depending upon a drive torque and a running speed of the motor vehicle.

* * * * *